Sept. 14, 1954  P. L. BORN  2,688,975
GAS GOVERNOR AND AUTOMATIC SHUTOFF VALVE
Filed Sept. 8, 1952  2 Sheets-Sheet 1

INVENTOR.
Paul L. Born
BY
Attys.

Sept. 14, 1954  P. L. BORN  2,688,975
GAS GOVERNOR AND AUTOMATIC SHUTOFF VALVE
Filed Sept. 8, 1952  2 Sheets-Sheet 2
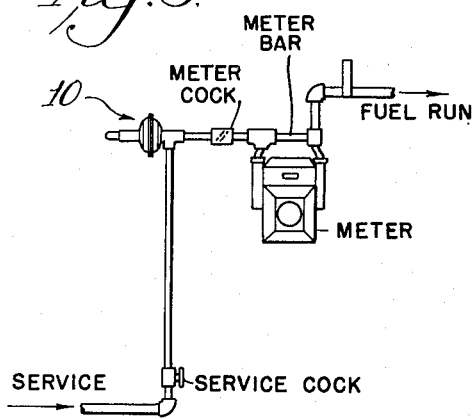
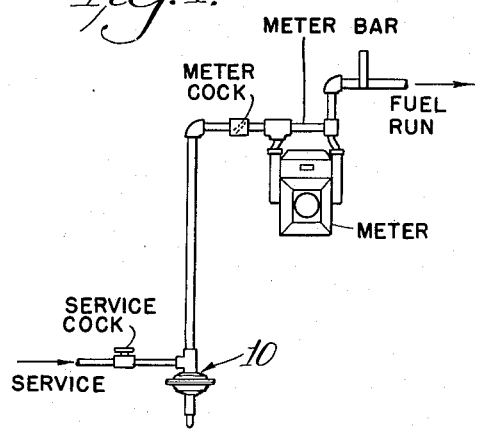
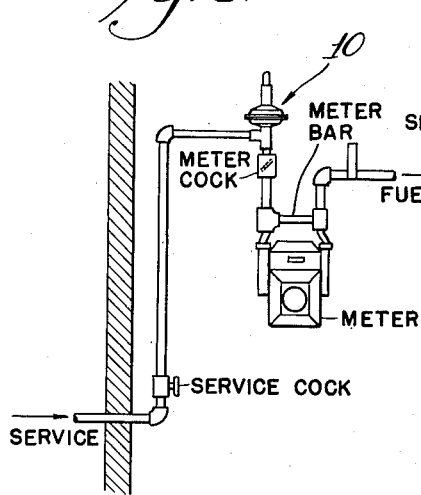
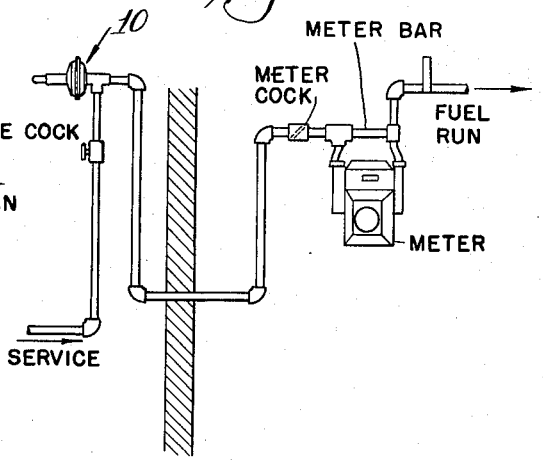
INVENTOR.
Paul L. Born
BY Brown, Jackson,
Boettcher & Dienner
Attys.

Patented Sept. 14, 1954

2,688,975

UNITED STATES PATENT OFFICE 2,688,975

GAS GOVERNOR AND AUTOMATIC
SHUTOFF VALVE

Paul L. Born, Wilmette, Ill.

Application September 8, 1952, Serial No. 308,483

10 Claims. (Cl. 137—73)

My present invention is related primarily to a new and improved combined gas regulator or governor and automatic shut-off valve for use in gas supply systems.

In general, one may consider a gas distribution system as a series of pipes leading from a point of supply to a plurality of consumption outlets, with the pipes carrying gas under pressure adequate to give the consumer, located furthest from the point of supply, enough gas to satisfy his various gas consuming needs. The size of the gas carrying pipes or mains are generally proportioned according to the maximum demand for the gas from the system unless increases in supply pressure can be successfully made from time to time to meet the fluctuations in consumption demand. Normally, to obviate the increasing loss in supply pressure as the consumption outlets progress further and further away from the supply point, a gas regulating device is inserted between the gas supplying main and the appliances serviced by the individual outlets. If this were not the case, only a limited number of consumers relatively close to the point of supply could be serviced by the system without causing excessive pressure fluctuation in the supply pressure to the consumers located furthest from the point of supply. By maintaining substantially equivalent outlet pressures it is possible to gain an even supply throughout the supply system so that customers all along the line are assured of a satisfactory gas supply. As a result of this practice greater economy and efficiency of operation of the supply system are obtained.

Further, in order to increase the number of outlets to which a gas main of a given diameter may carry a sufficient supply of gas at a desired operating pressure, it has been found feasible to maintain the pressure within the gas supply mains at a relatively high value to gain greater economy in operation. In this connection it is well recognized by those familiar with the art that the gas carrying capacity of a given size gas main or pipe varies directly as the square root of the pressure loss incurred along the line and that the investment cost or economy of operation varies inversely of the square root of such pressure loss. For example, if a gas main is large enough to meet a given supply demand at a pressure loss equivalent to approximately one inch of water pressure, double that amount of supply gas will be passed through the main if the pressure loss is increased to four inches of water pressure. In general it may then be stated that greater economy of operation may be gained by carrying higher supply pressure. However, with the supply pressures being maintained at a relatively high value to gain desired economy in the operation of the fuel supply system, the resultant danger of operation to the individual consumer is likewise increased. It will be understood in relation to this latter matter that higher pressures in the gas supply mains require accurate and reliable pressure regulating devices between the supply main and the consumer to avoid the possibility of the high supply main pressure from leaking past the regulating device into the consumer's appliances to cause their unsatisfactory operation. Likewise, when the gas pressures are excessively low, the pilot lights, associated with the various gas burning appliances at the consumer's outlet, often become extinguished, so that upon resumption of the normal supply pressure a dangerous condition may result.

Since the satisfactory and efficient consumption and utilization of their product is the constant effort of the gas utilities, considerable effort and money have been expended to guarantee a satisfactory regulating mechanism for use at the supply main outlets to guarantee safe and efficient operating conditions at all times for the consuming public. It is to this effort which my present invention is directed as will be recognized hereinafter.

The primary object of my present invention is to provide a new and improved gas regulating device having an automatic shut-off feature whereby regulation of the supply pressure to the service outlets and the operation of appliances attached to the outlet within a specified range of pressures is guaranteed at all times.

It is a further object of my invention to provide a valve readily adapted for mounting in a gas supply line and capable of automatically terminating the flow of gas in that line when the pressure supplied to the valve falls below a predetermined minimum or exceeds a predetermined maximum.

Another important object of my invention is to provide an automatic shut-off valve having a new and improved means for maintaining its operating mechanism free from dirt and residue carried by the gas as it flows through the valve.

Still another object of my invention is to provide a new and improved automatic gas governor and low pressure shut-off valve having a manual reset means whereby a shut-off condition of the valve, as induced by extremely low supply pressures will result in the valve being incapable of further regulating operation until manually reset so that if normal supply pressure returns to the system during the period when the valve is in its low pressure shut-off position the consuming outlet will not be resupplied with gas without the occurrence of a positive act to reset the valve mechanism to resume operation.

A still further object of my invention is to demonstrate the features of a new and improved gas governing and automatic shut-off valve device capable of installation in a household gas supply system in both horizontal and vertical positions whereby greater convenience and adaptability to various installing conditions result.

The above and further objects and features of my invention will appear to one skilled in the art from the following description and specification thereof and with reference to the accompanying drawings.

In the drawings:

Figure 3 is a diagrammatical illustration of one type of installation to which the device of my invention is adapted.

Figure 4 is a diagrammatical view, similar to Figure 3, demonstrating another installing position to which my device is adapted.

Figure 5 is another diagrammatical view similar to Figures 3 and 4 illustrating a further installing position for the device of my invention; and Figure 6 is still another diagrammatical view illustrating a further installing position for a governing and cut-off device as described herein.

Figure 1:
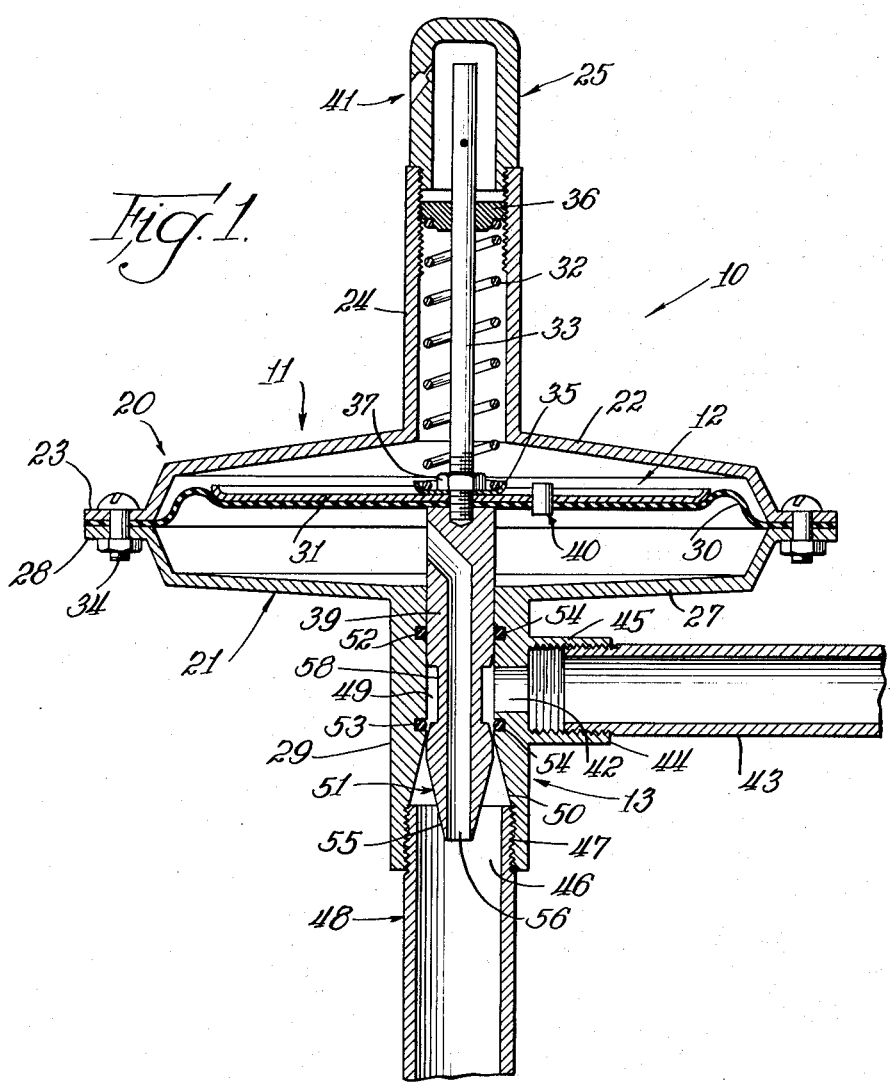
Figure 1 is a front elevational view in full cross section demonstrating the working features of an automatic gas governor and high and low pressure shut-off valve made in accordance with the teachings of my invention.
Figure 2:
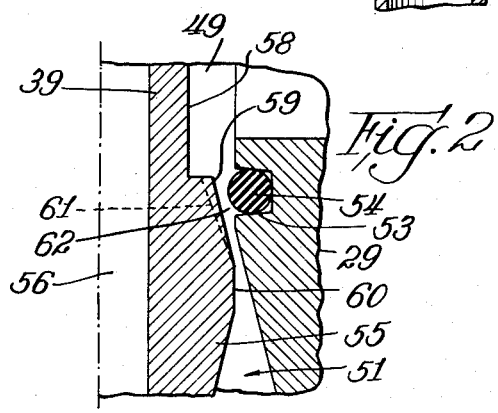
Figure 2 is a partial cross sectional view at an enlarged scale over the Figure 1 proportions, demonstrating in detail the new and improved throttling and valve seating arrangement I have devised for the gas governing and cut-off functioning of my device.

Referring now to Figures 1 and 2 of the drawings, it will be recognized that I have therein illustrated a preferred embodiment for an automatic gas governing and shut-off device in accordance with the teachings of my invention. In general, it will be noted that the device, indicated generally at 10 therein, comprises a two part diaphragm housing 11, a pressure reactive diaphragm means 12 disposed within the housing 11, and a gas regulating and valve means 13.

The diaphragm housing 11 is herein illustrated as comprising two chambers enclosed by an upper diaphragm chamber housing 20 and a lower diaphragm chamber housing 21.

The upper diaphragm chamber housing 20 includes a lower bell portion 22 having a planar peripheral skirt 23 and a cylindrical neck portion 24 which extends centrally upward from the bell portion. It will be recognized that the neck portion 24 is internally threaded adjacent its upper end for threading engagement with the lower end of a hollow cap member 25.

The lower chamber housing 21 is likewise provided with a bell portion 27 distinguished by a planar peripheral skirt 28, similar to the bell portion 22 of the upper chamber housing. The lower bell portion 27 is further distinguished by a downwardly projecting, central, cylindrical valve body 29 formed integrally with the bell portion 27 and designed to house my valve means 13 as will appear later herein.

Mounted within the diaphragm housing 11, comprising the upper and lower chamber housings 20 and 21, is the diaphragm means 12 comprising a resilient rubber or "Neoprene" materialed membrane 30, a circular diaphragm retaining plate 31 having a peripheral rolled edge to avoid rupture of the diaphragm membrane 30, an actuating spring 32 and a reset rod 33. The diaphragm means is assembled in the housing 11 in a conventional manner by mounting the upper and lower chamber housings 20 and 21 so that their peripheral skirts 22 and 28 firmly clamp the bounding edge of the diaphragm membrane 30 therebetween, in which position the membrane is tightly held, as by a plurality of bolt members 34 inserted transversely through the two skirt portions and locked in place in a conventional manner. The diaphragm retaining plate 31 is positioned centrally atop the membrane member 30 within the upper chamber housing 20 as illustrated. The regulating spring 32 and reset rod 33 are mounted in coaxial relation on top of the retaining plate to project coaxially of the extended neck portion 24 of the upper chamber housing 20. A lower spring retainer 35 is used between the retaining plate 31 and the lower end of the regulating spring 32 to centrally locate the latter. Compressive regulation of the spring is accomplished by an upper spring retainer 36 having a threaded exterior engageable with the threaded interior of the neck portion 24 and threadingly adjusted vertically therein to regulate the spacing between the two spring retainers and thus the compressive loading of spring 32. The reset rod 33 extends coaxially of the spring 32 with its upper end extending through the upper spring retainer 36 and into the interior of the cap member 25. The lower end of reset rod 33 is threaded into a nut or washer 37, positioned on top of the lower spring retainer 35, and extends downwardly through the retaining plate 31, membrane 30 and into the upper end of a stainless steel cylindrical valve piston 39 with which it is threadingly engaged.

Means for providing a disruption of the normally gas tight diaphragm in response to excessive atmospheric temperatures is provided in the form of a disruptable thermo-plug 40 which may be positioned as shown to extend through the retaining plate 32 and diaphragm membrane 30. Such a thermo-plug is a recognized expedient in the art for this purpose and is normally composed of Woodsmetal or a like thermo-disruptive material.

In normal operation the cap member 25 is also provided with a small angularly disposed vent opening 41 which is designed to allow atmospheric pressure to be maintained above the diaphragm membrane 30 in the upper diaphragm chamber enclosed by housing 20.

The valve mechanism 13 comprises the valve body 29 which coaxially journals the substantially cylindrical valve piston 39 for rectilinear sliding movement therein. The valve body 29 is further provided with an inlet opening 42 for admitting gas supplied from an inlet pipe 43 which is adjoined with the valve body 29 by virtue of a transversely extending cylindrical boss member 44 formed integrally with the valve body 29. Internal threads 45 are provided in boss 44 for threading connection with the inlet pipe 43 in a conventional manner. Similarly, the lower end of the valve body 29 is provided with an outlet opening 46 having internal threads 47 for engagement with an outlet pipe 48 whereby the outlet pipe is mounted coaxially with the valve body 29 below the valve piston 39. It will be recognized from Figure 1 of the drawings in particular, that the valve body 29 is provided at its upper end with an internal cylindrical piston chamber 49 for close fitting reception of valve piston 39. However, the lower end of the valve body's piston chamber is fashioned with an outwardly flared section 50 to form a substantially frusto-conical expansion chamber 51 which communicates with the cylindrical outlet opening 46 at the lower end of the valve body. The expansion chamber is designed to permit uniform expansion of the gas as it is metered from the supply inlet opening to the transversely related outlet opening in response to regulating action of the valve piston 39. It will be noted that the inlet opening 42 communicates with the cylindrical valve piston chamber 49 immediately above its conically flared portion 50.

Upper and lower annular recesses, 52 and 53 respectively, are formed coaxially of the valve piston chamber 49 one above the transverse inlet opening 42 and one immediately therebelow each for receiving a valve seating means comprising an annular O-ring 54 which provides sealing contact with the polished surface of the sliding valve piston 39. The O-rings are preferably constructed of a resilient material such as the commercially available oil-resistant synthetic rubber materials of the "Buna N" type.

As shown in Figure 1, in particular, valve piston 39 is formed as a substantially cylindrical rod, the lower end of which is conically tapered to complete the expansion chamber partially defined by the conically flared section 50 of the valve body. In this regard the included angle between the conical walls of the valve body and the valve piston is preferably maintained within a range of approximately 20 to 30° and is designed specifically to permit an even expansion of the gas flowing from the inlet to the outlet openings at a gradual rate and in a manner to avoid inefficient turbulence about the conical tip 55 of the valve piston. The valve piston 39 is further provided with an axial cylindrical control passage 56 which leads off angularly at its upper end to communicate with the chamber immediately below the diaphragm membrane 30 as defined by the lower diaphragm housing 21. An annular recess 58 is also formed about the body of the valve piston just above its conical tip portion so as to lie opposite the inlet opening 42 in the normal regulating operation of the valve piston to provide an annular chamber for the passage of gas around the valve piston. The length of the annular recess 58 is preferably somewhat greater than the diameter of the inlet opening 42 to provide sufficient leeway for the vertical positioning of the valve piston without undue restriction of the gas as it flows from the inlet opening into the annular chamber formed by recess 58 and the surrounding walls of the piston chamber 49. As specified heretofore, the upper end of the valve piston 39 is threadingly connected to the lower end of reset rod 33, with the diaphragm plate 31 and membrane 30 being tightly compressed between the nut 37, lower spring retainer 35 and the upper end of the valve piston 39.

Referring now to the enlarged cross sectional view Figure 2 of the drawings, wherein the lower O-ring 54 and the adjacent face of the valve piston 39 are illustrated, it will be observed that immediately adjacent the lower end of the annular recess 58, the valve piston is slightly tapered conically at 59 to provide a clearance and throttling chamber when the piston is moved past the lower O-ring. Formed intermediate the two conical portions or surfaces 59 and 55 of the piston 39, is a short cylindrical portion 60 which seals with the lower O-ring in the high pressure shut-off position of piston 39. To prevent gas pressure from unseating the lower O-ring from groove 53 and pressing the same tightly against the piston surface 59 during throttling action of the valve, a plurality of angularly disposed slots 61 are formed in surface 59 which permit equalization of gas pressure on all sides of the lower O-ring as surface 60 leaves closing contact therewith. In this regard, it will be appreciated that without the relief slots 61 or some similar expedient gas pressure would force the O-ring tightly against piston 39, unseating it from recess 53 so that downward movement of the valve piston would roll the O-ring out of groove 53 and wedge it tightly between the piston and the valve body to jamb the valve and damage the O-ring. Still further downward movement of the piston might even carry the O-ring into a position where it would "blow" into outlet 46. However, I have found by providing the plurality of slots 61, sufficient pressure is maintained on the inside of the O-ring to relieve the normal tendency of the gas pressure to unseat the ring from its housing recess 53.

*Use and operation*

Having thus described the structural makeup of a combination gas governor and automatic high and low pressure shut-off valve made in accordance with the teachings of my invention, I shall now set forth its working characteristics and mode of operation.

With the various parts of the valve assembled as shown in Figure 1, gas at pressures up to 100 p. s. i. g. is fed into inlet opening 42 via inlet pipe 43. The gas will pass into the annular chamber, formed by recess 58 of the valve piston, and pass the lower O-ring 54 into the conical expansion chamber 51 to the outlet opening 46. The gas, of course, is throttled as it passes the upper conical portion 59 of the valve piston and lower O-ring because of the restricted delivery passage 62 formed between the walls of the valve piston chamber 49 and the surfaces 59 and 60 of the valve piston. This throttling action results in an increase in velocity of the gas as it flows into the expansion chamber 51. The gas pressure at the lower end of the valve piston communicates with the underside of the diaphragm membrane 30 via the control passage 56. However, the pressure beneath the diaphragm will differ or be less than the outlet pressure at the outlet opening 46 by the amount of the velocity head of the gas flowing past the tip portion 55 of the valve piston. In this connection the conical configuration of the tip portion 55 of the valve piston is so designed as to provide a slight boost in delivery pressure to combat whatever weakening effect is experienced by the expansion of the spring 32 as the piston moves downwardly to increase the size of the delivery passage 62.

It should be pointed out that the cylindrical diameter of the valve piston across the section 60 is approximately 0.002″ smaller than the cylindrical diameter of the valve body piston chamber 49, thus providing a delivery passage between the valve body and valve piston at all times which would be uninterrupted if it were not for the presence of the lower sealing O-ring 54. It further will be appreciated that the valve, as illustrated in Figure 1 of the drawings, is in a regulating position so as to govern or regulate the gas flow between inlet and outlet openings 42 and 46 respectively. However, if there is a sudden reduction of pressure beneath the diaphragm membrane 30, such as would be caused by a loss of inlet pressure, a rupture of the outlet piping, or the like, spring member 32 will immediately force the diaphragm mechanism and valve piston downwardly to bring the cylindrical surface of the valve piston immediately above the annular recess 58 thereof into contact with the lower O-ring and cause the valve completely to shut off any gas flow from the inlet to the outlet. Likewise any rupturing of the diaphragm membrane 30 will cause a shut down of the valve due to equalization of pressure on both sides of diaphragm. This latter occurrence is particularly prevalent as it often happens that excessive external temperatures cause the diaphragm membrane 30 to burn through or crack, due to drying out. Further, the fusible plug 40 is designed as a safety rupturing means since such will rupture in the presence of preselected temperature to cause a loss of pressure beneath the diaphragm membrane and the eventual shut-down of the valve. After the valve has been placed in its low pressure shut-off position, as induced by a loss of pressure or an excessively low pressure beneath the diaphragm, it is necesary to manually reset the valve before its operation may be resumed. To this end, cap member 25 is removed and the reset rod 33 pulled upwardly by hand to permit the passage of gas to the chamber beneath the diaphragm. Of course, if the diaphragm has been ruptured for any reason or if the thermal plug 40 has ruptured, then the diaphragm must be replaced or sealed again before operation may resume.

Likewise, excessive inlet pressures will be communicated to the chamber below the diaphragm via the control passageway 56 to force the diaphragm upwardly against the force of spring member 32. This function serves to move the piston 39 upwardly with the center of membrane 30 to bring the valve piston's cylindrical surface 60 into contact with the lower O-ring 54, thus temporarily closing the delivery chamber or passage 62 until the excessive pressure beneath the diaphragm membrane 30 is expended. Thus, the high pressure shut-off or regulating function is provided. Likewise fluctuation of the diaphragm intermediate the shut-off positions of valve piston 39 serves to regulate the flow of gas into the expansion chamber 51, with a throttling effect being witnessed between the conical face 59 and the face of the valve body adjacent the lower O-ring to provide the requisite governing function for my device. In connection with the throttling action which take place during the governing function of the device, the O-rings are not a part of that throttling action, but serve solely as a shut-off seating means. The entire throttling action takes place between the metal faces of the valve body and valve piston. I have found that with a valve means as featured here, an almost constant delivery pressure is obtainable with the frictional contact of the O-rings on the stainless steel surface of the valve piston causing only a slight hysteresis in the delivery curve.

Further I have found that the installation of a valve of this character can be made with substantially equal success when the diaphragm is placed in either a horizontal or vertical position. However, in relation to the latter or vertical positioning of the diaphragm, it is noted that apparently increased frictional contact between the valve piston 39, the valve body 29 and O-rings 54 causes a less constant delivery pressure than is obtained when the diaphragm is positioned horizontally.

Further, it will be appreciated that, if desired, spring member 32 may be eliminated from the mechanism and such replaced with a dead weight to thus create a dead weight governor free of the variations in spring force created by the vertical expansion and contraction movement of a spring loaded governor as illustrated herein. If such a dead weight governor is required, of course, the diaphragm should be placed horizontally so that the full gravitational effect of the dead weight may be imposed on the movement of the diaphragm.

Further, many installations may require the utilization of a conventional safety seal and vent and to this end my device is adaptable by changing the position of the vent opening 41 from cap member 25 to the bell chamber 22 of the upper diaphragm chamber housing with the opening being of a size recognized by good practice. Connection of the safety seal will then be made with the outlet piping 43 and both the safety seal and vent piped to the outside in a known manner.

Referring now to the installation diagrams Figures 3, 4, 5 and 6, it is seen that my governor and shut-off device 10 may be installed, as shown in Figure 3, between the service cock and meter cock in line with the meter bar and in a condition whereby the diaphragm thereof is positioned vertically so that the outlet opening 46 thereof lies in line with the meter bar and the inlet opening 42 is in line with a vertical supply line.

A modified installation is demonstrated in Figure 4 wherein my regulator device is positioned between the service and meter cock, but this time conditioned so that the diagram thereof is positioned horizontally with the outlet opening 46 being in line with a vertical supply line leading to the meter and the inlet opening 42 aligned with a horizontal incoming service line.

A further modified installation is illustrated in Figure 5 wherein it will be recognized that my regulator 10 is positioned between the service and the meter cock at an elbow positioned above the meter box so that the outlet side of the device is in line with vertical piping leading to the meter cock while the inlet side is connected to a horizontal piping which is connected by elbows and pipes to the incoming service line. The diaphragm in this installation is horizontal.

Figure 6 shows a still further installation adapted for the device of my invention whereby such is positioned outside of a foundation wall and above ground. As illustrated in this figure, the incoming service line is directed vertically upward adjacent the retaining foundation and parallel thereto, to connect with the supply inlet opening 42 of my regulator. The outlet opening 46 is then connected with a horizontally aligned piping which, by means of suitable elbow connections and the like, is led downward vertically and horizontally through the foundation wall to connect with the meter in the supply system. In this last installation it will be seen that once again the diaphragm has been positioned vertically.

Thus it may be recognized that a device of the character described herein is readily adapted to various modes of installation, giving convenience and flexibility to its installation to meet various space and aligning conditions encountered in the field. Further, it will be appreciated that the simplicity of construction results in positive action between the pressure responsive diaphragm means and the valve means to make for a simple, economical, regulating device which I have found to be completely satisfactory in operation affording better regulation and lower lock-off pressures, accompanied by positive operation, irregardless of extremely high or extremely low inlet pressures, than has heretofore been accomplished in the art.

Further while I have herein illustrated one specific embodiment in which the features of my invention may appear, it will be appreciated that I do not wish to be limited to the specific embodiment illustrated and described herein except as may appear in the following appended claims.

I claim:

1. In a combined gas governor and automatic shut-off device of the class described, a pressure responsive diaphragm, a housing encasing said diaphragm and forming a gas tight chamber therebelow and an atmospheric chamber thereabove, adjustable spring means mounted in said atmospheric chamber and acting on the center of said diaphragm to bias the same downwardly, a cylindrical valve piston connected at its upper end to said diaphragm's center, coaxially with said spring means, and extending through said gas tight chamber, a valve body formed integrally with said housing and journalling said piston therein for rectilinear sliding movement, said valve body having an inlet opening formed at one side and an outlet opening formed at its lower end, both of which openings communicate with said piston, said piston having a cylindrical recessed portion formed intermediate its ends and dividing the cylindrical exterior thereof into upper and lower portions, said piston also having a control passage formed axially therethrough and communicating between the lower end of said piston and said gas tight chamber, a pair of vertically spaced valve seats mounted concentrically about said piston in said valve body, one of said seats having constant seating engagement with said piston's upper cylindrical portion and the second seat having periodic seating engagement with said piston's lower cylindrical portion whereby said piston serves to regulate the flow of gas from said inlet to said outlet opening when its cylindrical recess is moved opposite said second seat, to cause a shut-off of said flow in response to predetermined low outlet pressures when the upper limit of said recess is moved below said second seat and to cause an additional shut-off of said flow in response to predetermined high outlet pressures when the lower limit of said recess is moved above said second seat; the movement of said piston and its recess relative to said second seat being responsive to movement of said diaphragm as regulated by said spring means and gas pressures in said gas tight chamber, and manual reset means for disengaging said piston and second seat from their said low pressure shut-off positions.

2. A valve construction comprising a diaphragm housing, a pressure responsive diaphragm mounted transversely of said housing to separate the same into upper and lower chambers, adjustable load means mounted in said upper chamber to bias the center of said diaphragm toward said lower chamber, a hollow valve body formed integrally of said diaphragm housing and projecting outwardly therefrom in coaxial alignment with the center of said diaphragm and therebelow, said body having transversely related inlet and outlet openings communicating with a longitudinal piston chamber formed coaxially of said valve body, a cylindrical valve piston housed within said piston chamber for rectilinear sliding movement therein and connected to said diaphragm for movement therewith, a pair of parallel spaced annular valve seats, projecting inwardly of said piston chamber and for sealing engagement with the cylindrical sides of said piston to prevent the passage of gas from said inlet to said outlet opening and to said lower chamber, an annular recess formed inwardly of said piston's exterior to provide a passageway for the flow of gas past one of said valve seats and to said outlet opening, and a control passage formed coaxially of said piston and communicating with said lower chamber and said outlet opening for transmitting gas pressures from said outlet opening to said lower chamber thereby to bias said diaphragm against said load means in response to outlet pressures as regulated by the relative position of said recess and said one valve seat.

3. A combined gas regulating and shut-off valve, comprising, a diaphragm housing, a flexible diaphragm mounted transversely across said housing and separating the same into upper and lower diaphragm chambers, said upper diaphragm chamber communicating with the atmosphere by means of a vent opening formed in said housing and said lower chamber being gas tight; an adjustable load means positioned in said upper chamber and acting to bias the center of said diaphragm in one direction, reset means for manually biasing said diaphragm in opposition to said load means, a valve body formed integrally with said housing and projecting outwardly therebelow in transverse relation to said diaphragm, said valve body having transversely related inlet and outlet openings formed therein, a substantially cylindrical valve piston journalled in said valve body for rectilinear movement therein coaxially of said load means and said outlet opening, the upper end of said piston being connected to said diaphragm's center, an annular recess formed intermediate the ends of said piston and normally communicating with said inlet opening, upper and lower annular valve seats mounted in said valve body in parallel spaced relation coaxially about said piston, one above and one below said inlet opening, to form a pair of resilient gas tight seals with said piston, and a control passage formed coaxially of said piston and adapted to deliver gas pressure from said piston's lower end to said lower diaphragm chamber whereby movement of said piston to control passage of gas from said inlet to said outlet opening by varying the position of said piston's recess relative to said one valve seat is responsive to gas pressures in said lower diaphragm chamber.

4. A gas governing and automatic low pressure shut-off device of the class described comprising a hollow diaphragm housing, a flexible diaphragm mounted transversely across said housing to form an air tight diaphragm chamber therebelow, adjustable regulating means above said diaphragm for biasing the center thereof toward said lower chamber, a valve body formed integrally of said housing and having an axial cylindrical piston chamber formed therethrough and communicating with said lower chamber, an inlet opening formed in one side of said valve body and communicating with said piston chamber, an enlarged outlet opening formed at the lower end of said valve body coaxially of said piston chamber and communicating therewith via a conical internal wall portion of said valve body to form an expansion chamber at said valve body's lower end a cylindrical valve piston connected at its upper end the center of said diaphragm and movable therebelow rectilinearly in said piston chamber, an axial control passage formed longitudinally of said piston and communicating between said lower diaphragm and expansion chambers, an annular recess formed intermediate the ends of said piston, upper and lower pliant annular sealing rings mounted in parallel spaced relation concentrically of said piston, one above and one below said piston's recess, said upper ring preventing the direct passage of gas from said inlet opening to said lower diaphragm chamber and said lower ring acting as a valve seat for interrupting the flow of gas from said inlet to said outlet opening when cylindrical portions of said piston above and below its recess are moved into sealing contact therewith as regulated by pressure responsive movements of said diaphragm.

5. A valve of the class described, comprising in combination, a pressure responsive diaphragm means, a housing enclosing said diaphragm and forming an upper diaphragm chamber thereabove open to atmospheric pressure and a lower gas tight diaphragm chamber therebelow, an adjustable load means mounted in said upper chamber and acting transversely to the center of said diaphragm for biasing the same toward said lower chamber, a valve piston connected at its upper end to the center of said diaphragm and movable coaxially of said load means through said lower chamber, a control passage formed axially of said piston and communicating with said lower diaphragm chamber and the lower end of said piston, an annular recessed portion formed intermediate the ends of said piston, a valve body journalling said piston for rectilinear movement therein and having an inlet opening at one side thereof and an outlet opening at its lower end, said inlet opening communicating with said piston's recess and said outlet opening with said control passage; and a pair of annular pliant sealing rings mounted in said valve body and having sealing contact with the cylindrical side walls of said piston, the upper one of said rings being positioned between said inlet opening and said lower diaphragm chamber to prevent the direct passage of gas into the latter, and the lower of said rings being positioned between said inlet and outlet openings to periodically interrupt the flow of gas therebetween upon sealing engagement with the cylindrical exterior of said piston above and below said recess; said piston moving in said valve body in response to movement of said diaphragm in one direction as induced by said load means and in an opposite direction as induced by gas pressures in said lower diaphragm chamber.

6. A combined automatic gas regulating and low pressure shut-off device of the class described, comprising, a diaphragm housing, a valve body formed integrally with said housing and projecting coaxially outward therefrom, said valve body having an inlet opening formed in one side thereof and an outlet opening at its outer end, a piston chamber formed longitudinally of said valve body, coaxially of said outlet opening, and communicating with both said inlet and outlet openings and the interior of said diaphragm housing, a substantially cylindrical valve piston, having an inwardly recessed portion formed intermediate its ends, journalled in said piston chamber and extending from said diaphragm housing's interior to adjacent said outlet opening, a pressure responsive diaphragm means mounted across the interior of said diaphragm housing and dividing the same into two chambers, one of which is gas tight and the other of which is open to atmospheric pressure, said diaphragm being connected at its center to one end of said piston; means connected to said diaphragm, on the opposite side thereof from said piston, for biasing the same in one direction in opposition to gas pressure in said one gas tight chamber, annular resilient sealing means projecting inwardly of said piston chamber to provide a pair of gas tight valve seats with said piston, one of said sealing means constantly seating against said piston's cylindrical exterior and being located between said piston's recessed portion and said gas tight chamber, the other of said sealing means intermittently sealing with said piston's cylindrical exterior and being located between said inlet and said outlet opening, and a control passage formed axially in said piston and communicating between said outlet opening and said gas tight chamber to transmit gas pressures therebetween whereby said piston is moved rectilinearly in said piston chamber to regulate the flow of gas past said other sealing means and to interrupt said flow in response to fluctuating movements of said diaphragm as dictated by gas pressures in said gas tight chamber and said load means.

7. A gas governor and shut-off valve of the class described, adapted to maintain uniform outlet pressures and interrupt delivery at predetermined high and low outlet pressures, comprising, a hollow diaphragm housing, a diaphragm mounted in said housing and defining therewith a gas tight diaphragm chamber beneath said diaphragm and an atmospheric chamber thereabove, spring means mounted above said diaphragm for biasing the same downwardly, manual reset means for biasing said diaphragm against said spring means, a cylindrical valve piston projecting into said gas tight chamber and connected at its upper end in transverse relation to the center of said diaphragm whereby said piston is movable in response to movement of said diaphragm, a valve body connected with said diaphragm housing and journalling said piston for rectilinear movement therein, said valve body having an inlet opening formed through one wall thereof and communicating with one side of said piston, and an outlet opening formed at its lower end, a frustro conical expansion chamber formed in said valve body and connecting said outlet opening with the lower end of said piston, an annular recess formed inwardly of said piston's cylindrical exterior and normally positioned opposite said inlet opening, a first annular sealing ring concentrically contacting said piston above said inlet opening, a second annular sealing ring concentrically contacting said piston intermediate said inlet and outlet openings, both of said rings seating with the cylindrical exterior surface of said piston to prevent the passage of gas between said piston and valve body, and a control passage formed axially of said piston and extending between said expansion and lower diaphragm chambers for subjecting the lower side of said diaphragm to gas pressures in said expansion chamber, thereby to bias said diaphragm upwardly against said spring means whereby said valve piston is moved in response to said diaphragm's movements for positioning said recess relative to said second sealing ring in regulating the flow of said gas between said inlet and outlet openings and causing the interruption of gas flow at predetermined high and low outlet pressures.

8. A combined gas regulator and shut-off means of the class described, comprising in combination, a hollow diaphragm, a diaphragm means mounted internally of said housing and defining therewith a gas tight chamber and an atmospheric chamber, load means normally biasing said diaphragm in one direction, a valve piston projecting into said gas tight chamber and connected at one end to said diaphragm for responsive movements therewith, a valve body having connection with said diaphragm housing and journalling said valve piston, said valve body having an inlet opening in one wall thereof and an outlet opening formed coaxially of its lower end, sealing means intermediate said inlet and outlet openings in sealing contact with side walls of said valve piston, means communicating pressures at said outlet opening with said gas tight chamber thereby making movements of said diaphragm respond to outlet pressures, recessed means formed inwardly of said valve piston's side walls for permitting the passages of gas from said inlet to said outlet opening; such recessed means being positioned, in the normal operating condition of said diaphragm, opposite said inlet opening and extending beyond said sealing means, and thermo-responsive means communicating with said gas tight chamber for venting the same to atmosphere at predetermined ambient temperatures thereby to interrupt the flow of gas between said inlet and outlet openings.

9. A gas governor and automatic shut-off device of the class described, comprising in combination, a hollow diaphragm housing, a diaphragm means separating said housing into two chambers one of which is gas tight and other of which is open to atmosphere, adjustable load means acting on said diaphragm means for biasing the same in one direction, a valve piston connected at one end to said diaphragm and movable therewith coaxially of said load means, a valve body journalling said piston for rectilinear sliding movement and having a transverse inlet opening and a coaxial outlet opening, said valve piston having an annular recess formed inwardly of its exterior surface which normally communicates with said inlet opening and forms a passageway to said outlet opening, a control passageway formed through said valve piston and communicating between said gas tight chamber and said outlet opening, a pair of annular sealing means engaging the side walls of said piston at separated areas, one being located between said inlet opening and said gas tight chamber and the other of which is located between said inlet opening and said outlet opening, manual reset means connected to said diaphragm for opposing the normal biasing effects of said load means, and thermo-responsive means in said gas tight chamber for venting the same to atmosphere in the presence of predetermined ambient temperatures.

10. A combined gas regulator and shut-off valve device of the class described, comprising in combination, a hollow housing, a diaphragm separating said housing into two chambers, one of which is opened to atmosphere and the other which is gas tight, a valve body connected to said housing and extending therefrom, a valve piston connected at one end to said diaphragm and arranged for sliding coaxial movement in said valve housing, said valve housing having a lateral inlet opening and a coaxial outlet opening, the latter of which is disposed at the opposite end of said valve piston from its connection with said diaphragm, adjustable load means acting on said diaphragm and normally biasing the same and said piston toward said outlet opening, said valve piston having an annular recess formed thereabout normally communicating with said inlet opening, sealing means in said valve body located intermediate said inlet and outlet opening and arranged to contact said valve piston to prevent the passage of gas between said piston and valve body from said inlet to said outlet opening, said adjustable load means normally positioning the recess of said valve piston opposite said inlet opening and across said sealing means thereby to permit passage of gas from said inlet to said outlet openings, and passageway means formed in said valve piston for communicating pressures of said outlet opening to said gas tight chamber whereby said valve piston and diaphragm are responsive to outlet pressures.

References Cited in the file of this patent

UNITED STATES PATENTS

| Number | Name | Date |
| --- | --- | --- |
| 785,747 | Mathivet | Mar. 28, 1905 |
| 807,813 | Fiske | Dec. 19, 1905 |
| 942,042 | Petley | Nov. 30, 1909 |
| 2,053,611 | Hill | Sept. 8, 1936 |
| 2,496,036 | Christensen | Jan. 31, 1950 |

FOREIGN PATENTS

| Number | Country | Date |
| --- | --- | --- |
| 529,408 | Great Britain | Nov. 20, 1940 |